US011279429B2

(12) United States Patent
Miyakawa

(10) Patent No.: US 11,279,429 B2
(45) Date of Patent: Mar. 22, 2022

(54) AIRBAG DEVICE FOR RIDING TYPE VEHICLE

(71) Applicant: HONDA MOTOR CO., LTD., Tokyo (JP)

(72) Inventor: Futoshi Miyakawa, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 17/048,925

(22) PCT Filed: Apr. 27, 2018

(86) PCT No.: PCT/JP2018/017237
§ 371 (c)(1),
(2) Date: Oct. 19, 2020

(87) PCT Pub. No.: WO2019/207774
PCT Pub. Date: Oct. 31, 2019

(65) Prior Publication Data
US 2021/0170976 A1    Jun. 10, 2021

(51) Int. Cl.
B62J 27/20      (2020.01)
B60R 21/16     (2006.01)
B60R 21/00     (2006.01)
B62J 50/21      (2020.01)

(52) U.S. Cl.
CPC ............... B62J 27/20 (2020.02); B60R 21/16 (2013.01); B60R 2021/0088 (2013.01); B62J 50/21 (2020.02)

(58) Field of Classification Search
CPC ........... B62J 27/20; B62J 50/21; B60R 21/16; B60R 21/20; B60R 2021/0088
See application file for complete search history.

(56) References Cited

U.S. PATENT DOCUMENTS 7,104,568 B2     9/2006 Miyata
2007/0052214 A1*  3/2007 Miyata ............... B60R 21/2338
                                                   280/730.1
(Continued)

FOREIGN PATENT DOCUMENTS

EP    1762440 A1 *  3/2007  ......... B60R 21/2165
EP    2096022 A1 *  9/2009  ............. B62J 27/00
JP    2005-262975 A  9/2005
(Continued)

OTHER PUBLICATIONS

International Preliminary Report on Patentability dated Nov. 5, 2020, 6 pages.
(Continued)

Primary Examiner — Paul N Dickson
Assistant Examiner — Matthew D Lee
(74) Attorney, Agent, or Firm — Rankin, Hill & Clark LLP

(57) ABSTRACT

To be able to compactly dispose an airbag device for a riding type vehicle provided with an airbag deployable upward. An airbag device for a riding type vehicle that is compactly disposed and can be deployed upward, includes: an inflator; an airbag adapted to be expanded by gas discharged from the inflator; and a retainer accommodating the airbag. The airbag is deployed upward from an opening of the retainer. The retainer is provided below a meter provided in front of a handle for steering.

20 Claims, 5 Drawing Sheets

(56) References Cited

U.S. PATENT DOCUMENTS

2007/0187931 A1\* 8/2007 Horiuchi ............ B60R 21/2165
                                                    280/730.1
2021/0171145 A1\* 6/2021 Kuroki ................. B60R 21/215

FOREIGN PATENT DOCUMENTS

| JP | 2008-183913 | | 8/2008 | | |
|---|---|---|---|---|---|
| JP | 2011-73558 A | | 4/2011 | | |
| KR | 20070042452 A | \* | 4/2007 | ........... | B60R 21/233 |
| WO | WO-2019207776 A1 | \* | 10/2019 | .............. | B62J 27/20 |
| WO | WO-2020065939 A1 | \* | 4/2020 | .............. | B62J 27/20 |
| WO | WO-2020065948 A1 | \* | 4/2020 | .............. | B62J 27/20 |

OTHER PUBLICATIONS

European Search Report dated Mar. 12, 2021, 9 pages.
Indian Office Action dated Jun. 14, 2021, 5 pages.
International Search Report, dated Jul. 17, 2018, 4 pages.
Written Opinion off the International Searching Authority dated Jul. 17, 2018 filed in PCT/JP2018/017237, 3 pages.
Taiwanese Office Action dated May 9, 2019, 5 pages.

\* cited by examiner

AIRBAG DEVICE FOR RIDING TYPE VEHICLE

TECHNICAL FIELD

The present invention relates to an airbag device for a riding type vehicle.

BACKGROUND ART

In the related art, an airbag device for a riding type vehicle has been known in which an airbag, which is deployable outside the riding type vehicle, is deployed between an object of collision and the riding type vehicle (see Patent Literature 1, for example). According to the airbag device of Patent Literature 1, the airbag is deployed between the object of collision and the riding type vehicle, and the airbag is thus likely to increase in size.

CITATION LIST

Patent Literature

[Patent Literature 1]
  Japanese Patent Laid-Open No. 2008-183913

SUMMARY OF INVENTION

Technical Problem

Incidentally, in regard to an airbag device for a riding type vehicle, it is conceivable to protect a passenger with an airbag deployable substantially vertically upward in front of the passenger. It is desirable that such an airbag device be compactly disposed in the riding type vehicle.

An object of the present invention, which has been made in view of the aforementioned circumstances, is to be able to compactly dispose an airbag device for a riding type vehicle provided with an airbag deployable upward.

Solution to Problem

According to an aspect of the present invention, there is provided an airbag device for a riding type vehicle including: an inflator (53); an airbag (52) adapted to be expanded by gas discharged from the inflator (53); and a retainer (51) accommodating the airbag (52), the airbag (52) being deployed upward from an opening (63) of the retainer (51), in which the retainer (51) is provided below a meter (36) provided in front of a handle (23) for steering.

Also, in the aspect of the present invention, the opening (63) of the retainer (51) may be provided along a side edge portion (36c, 36d) and a front edge portion (36b) of the meter (36) outside the meter (36) in top view.

Also, in the aspect of the present invention, the opening (63) may be provided along both the left and right side edge portions (36c and 36d) of the meter (36).

Also, in the aspect of the present invention, the retainer (51) may include an overlapping portion (56) that overlaps the meter (36) in top view facing an upper surface of the meter (36) and an outer portion (57) provided along the side edge portion (36c, 36d) and the front edge portion (36b) of the meter (36) outside the meter (36), and at least a part of the airbag (52) may be accommodated in the overlapping portion (56).

Further, in the aspect of the present invention, at least a part of the inflator (53) may be accommodated in the overlapping portion (56).

Also, in the aspect of the present invention, the outer portion (57) may extend upward beyond the overlapping portion (56), and the opening (63) may be provided in an upper surface of the outer portion (57).

Also, in the aspect of the present invention, a cap member (54) provided along the side edge portion (36c, 36d) and the front edge portion (36b) of the meter (36) may cover the opening (63).

Also, in the aspect of the present invention, the meter (36) may be disposed in a recessed portion (55) provided above the retainer (51).

Advantageous Effects of Invention

According to the airbag device for a riding type vehicle of the aspect of the present invention, the airbag device includes: the inflator; the airbag adapted to be expanded by the gas discharged from the inflator; and the retainer accommodating the airbag, the airbag being deployed upward from the opening of the retainer, in which the retainer is provided below the meter provided in front of the handle for steering.

With this configuration, it is possible to dispose the inflator using a space below the meter and thereby to compactly provide the airbag device.

Also, in the aspect of the present invention, the opening of the retainer may be provided along the side edge portion and the front edge portion of the meter outside the meter in top view. With this configuration, it is possible to satisfactorily deploy the airbag upward from the opening of the retainer along the side edge portion and the front edge portion of the meter even regardless of the configuration in which the retainer is disposed below the meter.

Also, in the aspect of the present invention, the opening may be provided along both the left and right side edge portions of the meter. With this configuration, it is possible to satisfactorily deploy the airbag upward from the large opening along both the left and right side edge portions and the front edge portion of the meter.

Also, in the aspect of the present invention, the retainer may include the overlapping portion that overlaps the meter in top view facing the upper surface of the meter and the outer portion provided along the side edge portion and the front edge portion of the meter outside the meter, and at least a part of the airbag may be accommodated in the overlapping portion.

With this configuration, the overlapping portion of the retainer allows to secure a large size of retainer, and this facilitates accommodation of the airbag in the retainer. Also, it is possible to guide the airbag from the outer portion of the retainer to the opening.

Further, in the aspect of the present invention, at least a part of the inflator may be accommodated in the overlapping portion. With this configuration, it is possible to compactly dispose the inflator below the meter using the overlapping portion of the retainer.

Also, in the aspect of the present invention, the outer portion may extend upward beyond the overlapping portion, and the opening may be provided in the upper surface of the outer portion. With this configuration, the outer portion provided with the opening in the upper surface thereof extends upward beyond the overlapping portion, and it is thus possible to satisfactorily deploy the airbag upward from the opening at a higher position than the overlapping portion.

Also, in the aspect of the present invention, the cap member provided along the side edge portion and the front edge portion of the meter may cover the opening. With this configuration, it is possible to satisfactorily block, with the cap member, the opening provided along the side edge portion and the front edge portion of the meter, to prevent foreign matters from entering the retainer, and to improve exterior properties.

Also, in the aspect of the present invention, the meter may be disposed in the recessed portion provided above the retainer. With this configuration, it is possible to compactly dispose the meter in the recessed portion above the retainer and to easily provide the opening along the side edge portions and the front edge portion of the meter.

DESCRIPTION OF EMBODIMENT

Hereinafter, an embodiment of the present invention will be described with reference to drawings. Note that indications of directions such as front, rear, left, right, up, and down in the description will be defined to be the same as directions relative to a vehicle body unless particularly indicated otherwise. Also, the reference sign FR represented in each diagram represents the front side of the vehicle body, the reference sign UP represents the upper side of the vehicle body, and the reference sign LH represents the left side of the vehicle body.

Figure 1:
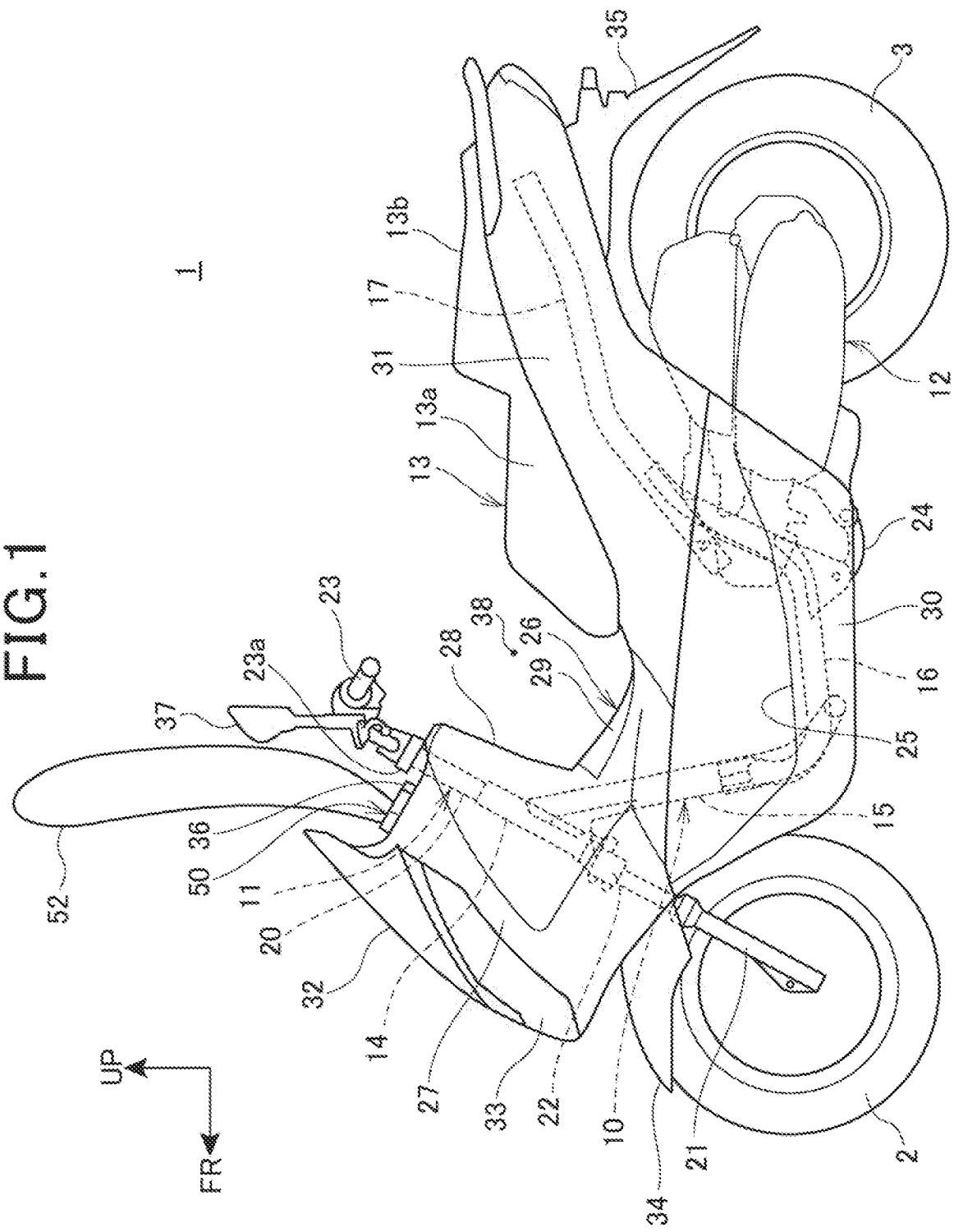
FIG. 1 is a left side view of a motorcycle according to an embodiment of the present invention.

FIG. 1 is a left side view of a motorcycle 1 according to an embodiment of the present invention. In FIG. 1, a state in which an airbag 52 that will be described later has been expanded and deployed. Note that FIG. 1 illustrates only components on the left side including reference signs for components that are provided as pairs on the left and right sides.

The motorcycle 1 is a riding type vehicle of a scooter type including a vehicle body frame 10, a steering system 11 adapted to support a front wheel 2 in a steerable manner, a power unit 12 supported at a rear portion of the vehicle body frame 10, a rear wheel 3, and a seat 13 in which a passenger is seated in a straddling manner.

The vehicle body frame 10 includes a head pipe 14 provided at a front end of the vehicle body frame 10, a main frame 15 extending toward a rear lower side from the head pipe 14, a pair of left and right lower frames 16, 16 extending backward from a lower end portion of the main frame 15, and a pair of left and right rear frames 17, 17 extending backward toward a rear upper side from the lower frames 16, 16. The head pipe 14 is disposed at the center of a vehicle width similarly to the front wheel 2.

The steering system 11 includes a steering shaft 20 pivotally supported by the head pipe 14, a pair of left and right front forks 21, 21 disposed on both left and right sides of the front wheel 2 and supporting the front wheel 2, a bridge member 22 secured to a lower end of the steering shaft 20 and coupling upper portions of the left and right front forks 21, 21, and a handle 23 secured to an upper end of the steering shaft 20. The handle 23 for steering is connected to the steering shaft 20 via a handle post 23a secured to the upper end of the steering shaft 20.

In a side view of the vehicle, the head pipe 14 is inclined backward with respect to the vertical direction by the amount of a predetermined caster angle set in the motorcycle 1. The steering shaft 20 is inserted into and pivotally supported by the head pipe 14 and is disposed so as to be inclined backward in a side view of the vehicle.

The power unit 12 is a unit swing engine that has functions of an engine as a drive source for the rear wheel 3 and of a swing arm that supports the rear wheel 3. The power unit 12 is pivotally supported by the vehicle body frame 10 so as to be able to swing via a link member 24 provided at a front end portion of the power unit 12.

The seat 13 is provided above the rear frame 17. The seat 13 includes a front-side seat 13a in which a driver is seated and rear-side seat 13b in which a fellow passenger is seated in an integrated manner.

A pair of left and right step floors 25, 25 on which the driver places his/her left and right feet are provided on a front lower side of the front-side seat 13a.

The motorcycle 1 includes a vehicle body cover 26 adapted to cover a vehicle body such as the vehicle body frame 10.

The vehicle body cover 26 includes a front cover 27 that covers upper portions of the head pipe 14 and the steering system 11 from the front side and from the left and right sides and an inner cover 28 that is continued to a rear edge of the front cover 27 and covers the upper portions of the head pipe 14 and the steering system 11 from the rear side.

Also, the vehicle body cover 26 includes a center cover 29 located on a front lower side of the front-side seat 13a, an undercover 30 that covers the vehicle body from the lower side below the step floors 25, 25, and a rear-side cover 31 that covers the rear frames 17, 17 from the sides below the seat 13.

A wind screen 32 that is inclined toward the rear upper side in a side view of the vehicle is attached to an upper portion of the front cover 27. A headlight 33 is provided on a front surface of the front cover 27.

The motorcycle 1 includes a front fender 34 and a rear fender 35.

The meter 36 adapted to display information regarding the motorcycle 1 such as a vehicle speed is disposed in front of the handle 23. A rear-view mirror 37 is attached to the handle 23.

A front portion of the center cover 29 is continued to a lower portion of the inner cover 28. The center cover 29 is located inside left and right legs of the driver stretched from the front-side seat 13a to the step floors 25, 25.

A straddled space 38 recessed downward is sectioned by the inner cover 28, the center cover 29, and a front surface of the front-side seat 13a in a side view of the vehicle. The passenger can straddle the motorcycle 1 via the straddled space 38 when the passenger rides on and gets off the motorcycle 1.

The motorcycle 1 includes an airbag device 50 adapted to protect the passenger from impact. The airbag device 50 is disposed between the steering system 11 and the wind screen 32 in a side view of the vehicle and is located in front of the handle 23.

Figure 2:
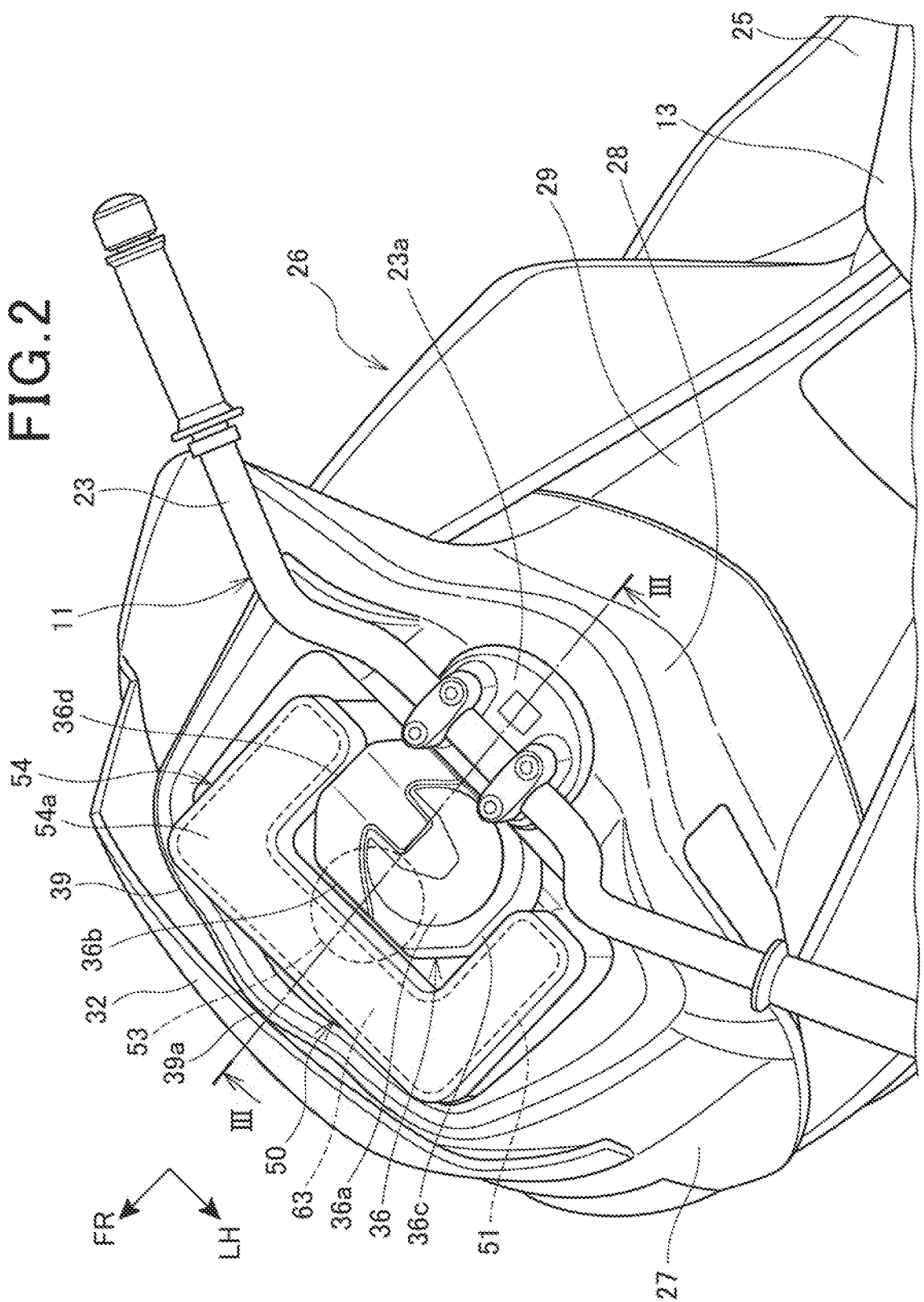
FIG. 2 is a perspective view of a peripheral portion of a handle when seen from an upper side.
Figure 3:
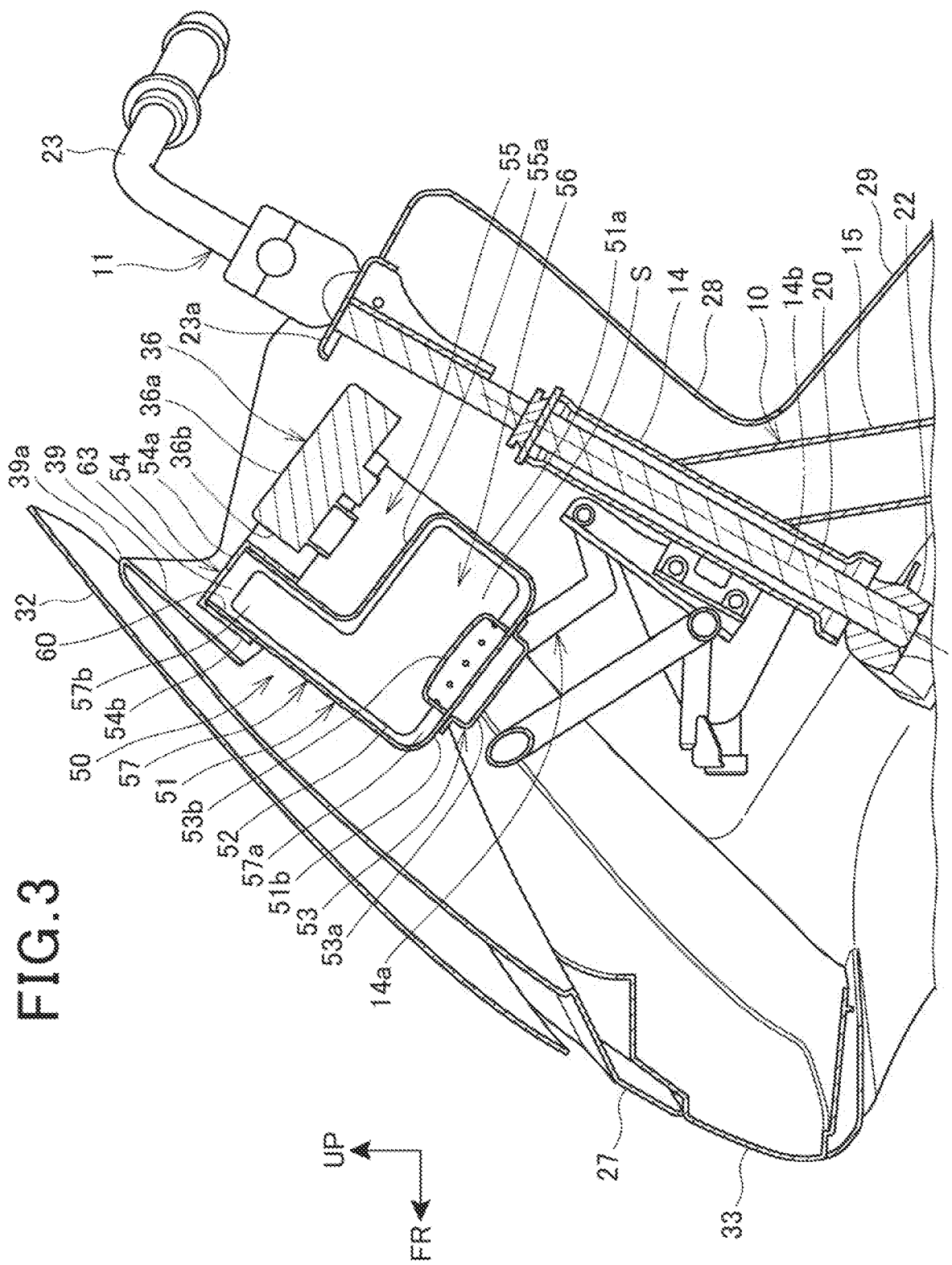
FIG. 3 is a sectional view along III-III in FIG. 2.

FIG. 2 is a perspective view of a peripheral portion of the handle 23 when seen from the upper side. FIG. 3 is a sectional view along III-III in FIG. 2. In FIGS. 2 and 3, the rear-view mirror 37 is not illustrated.

Referring to FIGS. 2 and 3, the meter 36 is formed into a flat box shape and is disposed such that a plate thickness direction is oriented in an up-down direction. The meter 36 has a rectangular shape that is long in a vehicle width direction when seen from the upper side.

The meter 36 is disposed at the center of the vehicle width above the head pipe 14 and in front of the handle post 23a. The meter 36 is disposed such that a display surface 36a on the upper surface thereof is inclined toward a rear lower side in order for the driver on the rear upper side to easily view the meter 36.

Since the meter 36 is secured to the vehicle body, the meter 36 does not turn even when the handle 23 is steered.

A visor 39 extending toward the rear upper side is provided above the front cover 27. The visor 39 is a wall portion extending toward the rear upper side in front of the meter 36 and covers the meter 36 from the front upper side.

The visor 39 is covered with the wind screen 32 from the front side. An upper end 39a of the visor 39 is located below the upper end of the wind screen 32.

As illustrated in FIG. 3, the vehicle body frame 10 includes a stay 14a extending forward from the head pipe 14. The headlight 33 and the front cover 27 are supported by the stay 14a.

The airbag device 50 is disposed on the front upper side of the head pipe 14 and between the meter 36 and the visor 39 in a side view of the vehicle.

The airbag device 50 includes a box-shaped retainer 51, the airbag 52 accommodated in the retainer 51, an inflator 53 adapted to discharge gas into the airbag 52, and a cap member 54 adapted to block the upper surface of the retainer 51.

Figure 4:
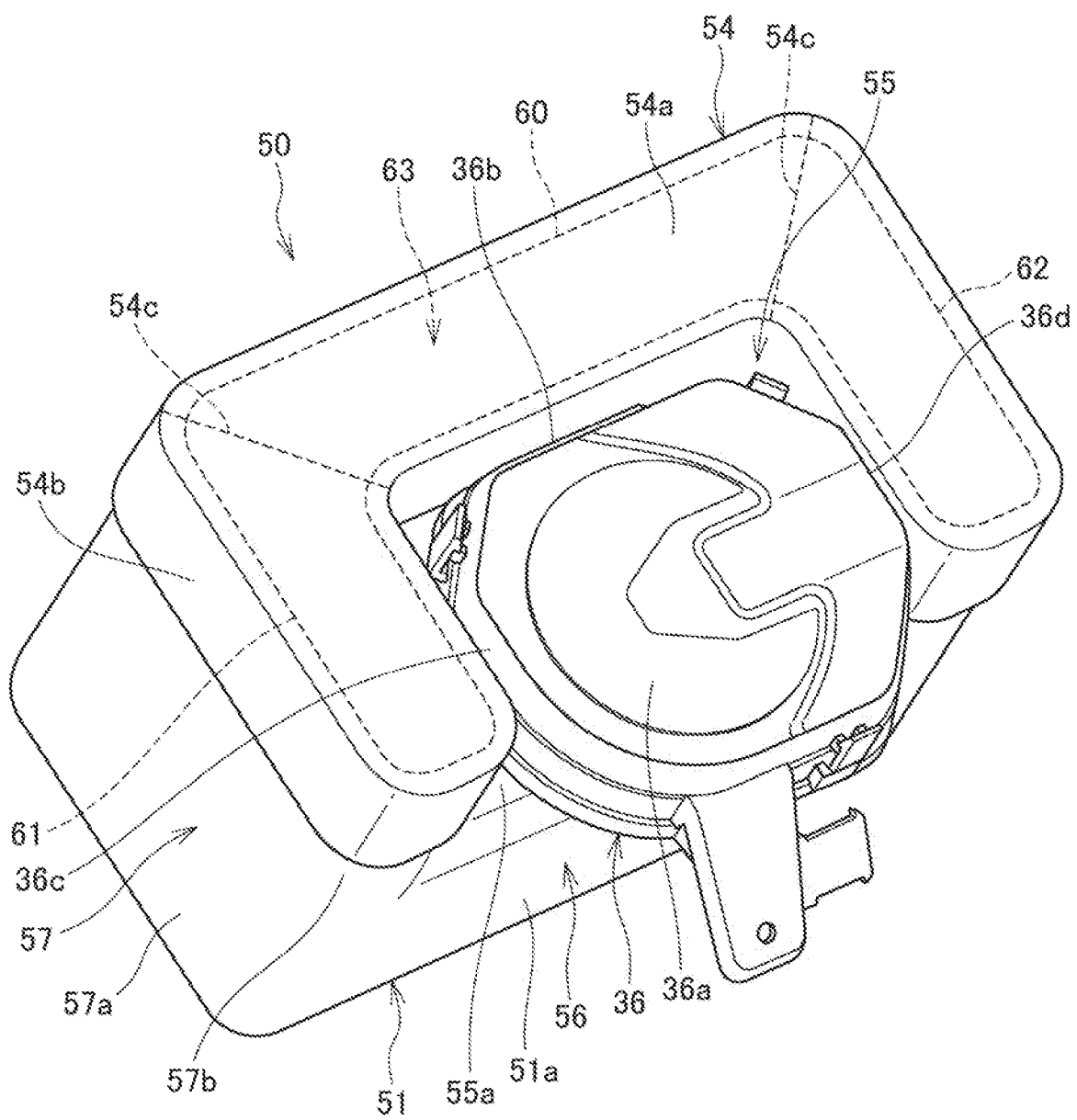
FIG. 4 is a perspective view of an airbag device when seen from the upper side.
Figure 5:
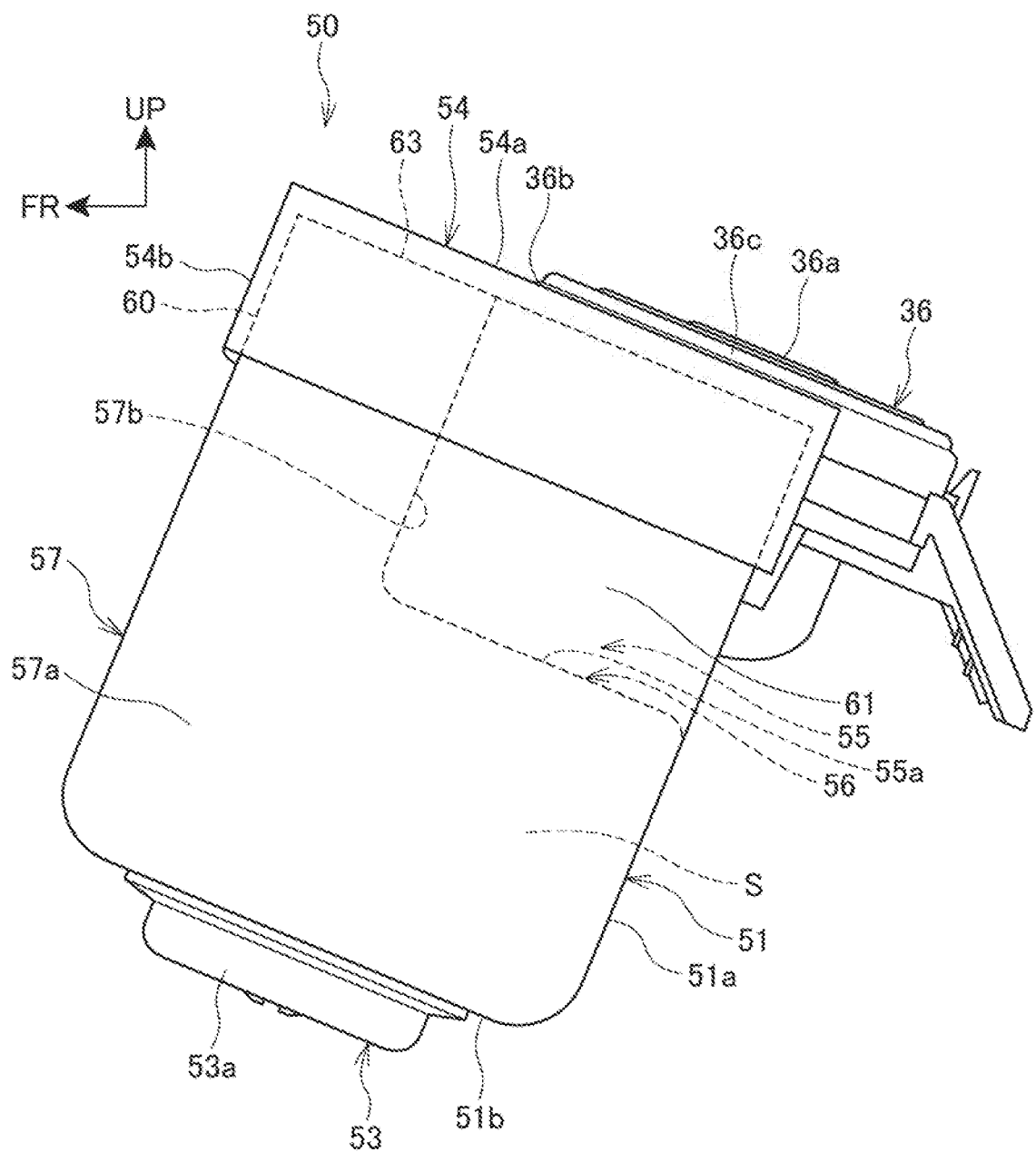
FIG. 5 is a left side view of the airbag device.

FIG. 4 is a perspective view of the airbag device 50 when seen from the upper side. FIG. 5 is a left side view of the airbag device 50.

Referring to FIGS. 3 to 5, the retainer 51 is a rectangular parallelepiped box with an upper surface partially opened and is hollow inside. The airbag 52 is accommodated in the hollow. The retainer 51 is disposed above the head pipe 14, below the meter 36, and at the center of the vehicle width. Also, the retainer 51 is located between the meter 36 and the wind screen 32 in a front-back direction of the vehicle. The retainer 51 is disposed behind the headlight 33.

The retainer 51 includes a recessed portion 55, which is the upper surface of the retainer 51 recessed downward, at the center rear portion in the vehicle width direction of the retainer 51. The recessed portion 55 has a substantially rectangular shape in top view and opens on the upper side and the rear side of the retainer 51.

The meter 36 is disposed in the recessed portion 55.

The retainer 51 includes an overlapping portion 56 provided below the recessed portion 55. The overlapping portion 56 is a portion that overlaps the meter 36 from the lower side in top view facing the upper surface of the meter 36.

Also, the retainer 51 includes an outer portion 57 provided so as to surround the overlapping portion 56 and the recessed portion 55 from the front side and from both the left and right sides.

The outer portion 57 is located outside the meter 36 in top view facing the upper surface of the meter 36.

A lower portion 57a of the outer portion 57 is continued to the overlapping portion 56. The space inside the outer portion 57 and the overlapping portion 56 is an airbag accommodation space S in which the airbag 52 is accommodated.

An upper portion 57b of the outer portion 57 extends upward beyond the overlapping portion 56 and a bottom surface 55a of the recessed portion 55 and surrounds the meter 36 from the front side and from the sides. An inner space of the upper portion 57b is also the airbag accommodation space S. Note that the bottom surface 55a of the recessed portion 55 is the upper surface of the overlapping portion 56.

Specifically, the upper portion 57b of the outer portion 57 includes a front portion 60 along a front edge portion 36b of the meter 36, a side portion 61 along a side edge portion 36c on one side (left) of the meter 36 in the vehicle width direction, and a side portion 62 along a side edge portion 36d on the other side (right) of the meter 36 in the vehicle width direction.

In other words, the upper portion 57b of the outer portion 57 is formed into a U shape in top view by the front portion 60, the side portion 61, and the side portion 62. The meter 36 is disposed behind the front portion 60 and between the side portion 61 and the side portion 62. A rear portion of the meter 36 projects backward beyond a rear surface 51a of the retainer 51.

Upper surfaces of the front portion 60, the side portion 61, and the side portion 62 of the upper portion 57b of the retainer 51 correspond to an opening 63 that is opened upward. The opening 63 is located outside the meter 36 in top view and is provided along the side portion 61, the front portion 60, and the side portion 62 of the meter 36. The opening 63 has a U shape in top view. The airbag 52 is deployed upward from the opening 63.

The inflator 53 is provided on a bottom surface 51b of the retainer 51.

The inflator 53 is disposed at the center of the retainer 51 in the vehicle width direction such that most parts except for the front end portion are disposed in the overlapping portion 56. In other words, the inflator 53 overlaps the meter 36 from the lower side in top view facing the upper surface of the meter 36. For this reason, it is possible to compactly dispose the inflator 53 using a space below the meter 36. Note that the inflator 53 may be provided on the rear surface or the upper surface of the overlapping portion 56.

The inflator 53 includes a cylindrical housing 53a. A gas forming agent and an initiator that causes the gas forming agent to start a reaction of generating gas are provided inside the housing 53a. The initiator includes an ignition device. A gas discharge portion 53b of the inflator 53 is located inside the retainer 51.

As illustrated in FIG. 3, the airbag 52 is accommodated in the airbag accommodation space S configured of the outer portion 57 and the overlapping portion 56 of the retainer 51 and is partially disposed in the overlapping portion 56. In other words, the airbag 52 overlaps the meter 36 from the lower side in top view facing the upper surface of the meter 36. Therefore, it is possible to compactly dispose the airbag 52 using the space below the meter 36. The airbag 52 is accommodated in the retainer 51 in a folded state. A lower end portion of the airbag 52 is connected to the inflator 53.

The motorcycle 1 includes an acceleration sensor (not illustrated) adapted to detect impact acting on the motorcycle 1. The acceleration sensor is electrically connected to a control unit (not illustrated) of the motorcycle 1, and the control unit is electrically connected to the inflator 53. The control unit determines whether or not to operate the airbag device 50 on the basis of detected acceleration. In a case in which the airbag device 50 is to be operated, the control unit operates the inflator 53 to discharge gas into the airbag 52. The airbag 52 is expanded by a gas pressure and is deployed upward.

The cap member 54 is formed into a U shape along the front edge portion 36b, the side edge portion 36c, and the side edge portion 36d of the meter 36 corresponding to the shape of the opening 63 of the retainer 51.

The cap member 54 includes a cap upper surface portion 54a adapted to cover the opening 63 from the upper side and a cap peripheral wall portion 54b fitted to a peripheral edge portion of the opening 63 in an integrated manner.

The cap member 54 is attached to the retainer 51 by the inner peripheral surface of the cap peripheral wall portion 54b being fitted to the outer peripheral surface of the peripheral edge portion of the opening 63.

The cap member 54 includes cleavage portions 54c, 54c at positions corresponding to a boundary portion between the front portion 60 and the side portion 61 and a boundary portion between the front portion 60 and the side portion 62 of the upper portion 57b of the retainer 51. The cleavage portions 54c, 54c are groove portions provided in a rear surface of the cap member 54, for example.

As illustrated in FIG. 3, the airbag device 50 is supported by the vehicle body frame 10 by the retainer 51 being supported by and secured to the stay 14a.

The airbag device 50 is disposed such that the rectangular parallelepiped retainer 51 is inclined backward along an axial line 14b of the head pipe 14 in a side view of the vehicle. It is thus possible to compactly dispose the retainer 51 in front of the steering system 11.

Also, the upper portion 57b of the outer portion 57 is inclined backward in a side view of the vehicle, and the airbag 52 is deployed toward the rear upper side along the visor 39 and the wind screen 32 from the opening 63. The opening 63 is provided in substantially the same plane as the display surface 36a in front of the display surface 36a of the meter 36 disposed so as to be inclined toward the rear lower side, and is opened at a higher position than the display surface 36a.

Once gas is discharged from the inflator 53, the airbag 52 is expanded by the gas and is then deployed upward through the upper portion 57b of the outer portion 57 of the retainer 51. Once the airbag 52 expands, the cap member 54 is pushed and cleaved by the airbag 52, and the airbag 52 (see FIG. 1) is deployed from the opening 63 to the outer upper side. The cap member 54 is cleaved starting from the cleavage portions 54c, 54c.

Since the retainer 51 is disposed below the meter 36 in the embodiment, it is possible to compactly dispose the retainer 51 in front of the motorcycle 1. Also, since the opening 63 is provided so as to surround the meter 36 from the left and right sides and the front side, it is possible to satisfactorily deploy the airbag 52 upward from the opening 63 located in the surroundings of the meter 36 regardless of the configuration in which the retainer 51 is disposed below the meter 36.

Also, the airbag device 50 is provided above the head pipe 14 and is located near the upper body of the passenger from the head to the breast in the up-down direction. It is thus possible to appropriately protect the passenger even when the length of the airbag 52 in the up-down direction in a deployed state is reduced and thereby to reduce the size of the airbag device 50.

As described above, according to the embodiment to which the present invention is applied, the airbag device 50 of the motorcycle 1 includes the inflator 53, the airbag 52 adapted to be expanded by gas discharged from the inflator 53, and the retainer 51 accommodating the airbag 52, the airbag 52 being deployed upward from the opening 63 of the retainer 51, and the retainer 51 is provided below the meter 36 provided in front of the handle 23 for steering.

With this configuration, it is possible to dispose the retainer 51 using the space below the meter 36 and to compactly provide the airbag device 50.

Also, the opening 63 of the retainer 51 is provided outside the meter 36 and along the side edge portions 36c, 36d and the front edge portion 36b of the meter 36 in top view. With this configuration, it is possible to satisfactorily deploy the airbag 52 upward from the opening 63 of the retainer along the side edge portions 36c, 36d and the front edge portion 36b of the meter 36 regardless of the configuration in which the retainer 51 is disposed below the meter 36.

Also, the opening 63 is provided along both the left and right side edge portions 36c, 36d of the meter 36. With this configuration, it is possible to satisfactorily deploy the airbag 52 upward from the large opening 63 along both the left and right side edge portions 36c, 36d and the front edge portion 36b of the meter 36.

Also, the retainer 51 includes the overlapping portion 56 overlapping the meter 36 in top view facing the upper surface of the meter 36 and the outer portion 57 provided along the side edge portions 36c, 36d and the front edge portion 36b of the meter 36 outside the meter 36, and the airbag 52 is accommodated in the overlapping portion 56.

With this configuration, it is possible to secure a large size of retainer 51 using the overlapping portion 56 of the retainer 51, and this facilitates accommodation of the airbag 52 in the retainer 51. Also, it is possible to guide the airbag 52 from the outer portion 57 of the retainer 51 to the opening 63.

Further, at least a part of the inflator 53 is accommodated in the overlapping portion 56. With this configuration, it is possible to compactly dispose the inflator 53 below the meter 36 using the overlapping portion 56 of the retainer 51.

Also, the outer portion 57 of the retainer 51 extends upward beyond the overlapping portion 56, and the opening 63 is provided in the upper surface of the outer portion 57. With this configuration, the outer portion 57 provided with the opening 63 in the upper surface thereof extends upward beyond the overlapping portion 56, and it is thus possible to satisfactorily deploy the airbag 52 upward from the opening 63 at the higher position than the overlapping portion 56.

Also, the cap member 54 provided along the side edge portions 36c, 36d and the front edge portion 36b of the meter 36 covers the opening 63. With this configuration, it is possible to satisfactorily block the opening 63 provided along the side edge portions 36c, 36d and the front edge portion 36b of the meter 36 with the cap member 54, to prevent foreign matters from entering the retainer 51, and to improve exterior properties.

Also, the meter 36 is disposed in the recessed portion 55 provided above the retainer 51. With this configuration, it is possible to compactly dispose the meter 36 in the recessed portion 55 above the retainer 51 and to easily provide the opening 63 along the side edge portions 36c, 36d and the front edge portion 36b of the meter 36.

Note that the aforementioned embodiment illustrates an aspect to which the present invention is applied, and the present invention is not limited to the aforementioned embodiment.

Although the aforementioned embodiment has been described on the assumption that the opening 63 is provided along both the left and right side edge portions 36c, 36d and the front edge portion 36b of the meter 36, the present invention is not limited thereto. For example, the opening 63 may be provided along one of the left and right side edge portions, namely the side edge portion 36c and the front edge portion 36b. In this case, the opening 63 has an L shape in top view.

Also, although the aforementioned embodiment has been described on the assumption that the meter 36 is provided in the recessed portion 55, which is the upper surface of the retainer 51 recessed downward, the present invention is not limited thereto. For example, the meter 36 may be disposed above a retainer with a flat upper surface, and the opening along the side edge portions 36c, 36d and the front edge portion 36b of the meter 36 may be provided in an upper surface of the retainer so as to surround the meter 36.

Also, although the motorcycle 1 has been described above as an example of a riding type vehicle in the aforementioned embodiment, the present invention is not limited thereto, and the present invention can be applied to a three-wheel riding type vehicle provided with two front wheels or rear wheels or a riding type vehicle provided with four or more wheels.

REFERENCE SIGNS LIST

1 Motorcycle (riding type vehicle)
23 Handle
36 Meter
36b Front edge portion
36c, 36d Side edge portion
50 Airbag device
51 Retainer
52 Airbag
53 Inflator
54 Cap member
55 Recessed portion
56 Overlapping portion
57 Outer portion
63 Opening

The invention claimed is:

1. An airbag device for a riding type vehicle comprising:
an inflator;
an airbag adapted to be expanded by gas discharged from the inflator; and
a retainer accommodating the airbag, the airbag being deployed upward from an opening of the retainer,
wherein the retainer is provided below a meter provided in front of a handle for steering, and
the opening of the retainer is provided along a side edge portion and a front edge portion of the meter outside the meter in top view.

2. The airbag device for a riding type vehicle according to claim 1, wherein the opening is provided along both the left and right side edge portions of the meter.

3. The airbag device for a riding type vehicle according to claim 1,
wherein the retainer includes an overlapping portion that overlaps the meter in top view facing an upper surface of the meter and an outer portion provided along the side edge portion and the front edge portion of the meter outside the meter, and
at least a part of the airbag is accommodated in the overlapping portion.

4. The airbag device for a riding type vehicle according to claim 3, wherein at least a part of the inflator is accommodated in the overlapping portion.

5. The airbag device for a riding type vehicle according to claim 3, wherein the outer portion extends upward beyond the overlapping portion, and the opening is provided in an upper surface of the outer portion.

6. The airbag device for a riding type vehicle according to claim 1, wherein a cap member provided along the side edge portion and the front edge portion of the meter covers the opening.

7. The airbag device for a riding type vehicle according to claim 1, wherein the meter is disposed in a recessed portion provided above the retainer.

8. The airbag device for a riding type vehicle according to claim 2,
wherein the retainer includes an overlapping portion that overlaps the meter in top view facing an upper surface of the meter and an outer portion provided along the side edge portion and the front edge portion of the meter outside the meter, and
at least a part of the airbag is accommodated in the overlapping portion.

9. The airbag device for a riding type vehicle according to claim 4, wherein the outer portion extends upward beyond the overlapping portion, and the opening is provided in an upper surface of the outer portion.

10. The airbag device for a riding type vehicle according to claim 2, wherein a cap member provided along the side edge portion and the front edge portion of the meter covers the opening.

11. The airbag device for a riding type vehicle according to claim 3, wherein a cap member provided along the side edge portion and the front edge portion of the meter covers the opening.

12. The airbag device for a riding type vehicle according to claim 4, wherein a cap member provided along the side edge portion and the front edge portion of the meter covers the opening.

13. The airbag device for a riding type vehicle according to claim 5, wherein a cap member provided along the side edge portion and the front edge portion of the meter covers the opening.

14. The airbag device for a riding type vehicle according to claim 2, wherein the meter is disposed in a recessed portion provided above the retainer.

15. The airbag device for a riding type vehicle according to claim 3, wherein the meter is disposed in a recessed portion provided above the retainer.

16. The airbag device for a riding type vehicle according to claim 4, wherein the meter is disposed in a recessed portion provided above the retainer.

17. The airbag device for a riding type vehicle according to claim 5, wherein the meter is disposed in a recessed portion provided above the retainer.

18. The airbag device for a riding type vehicle according to claim 6, wherein the meter is disposed in a recessed portion provided above the retainer.

19. An airbag device for a riding type vehicle comprising:
an inflator;
an airbag adapted to be expanded by gas discharged from the inflator; and
a retainer accommodating the airbag, the airbag being deployed upward from an opening of the retainer,
wherein the retainer is provided below a meter provided in front of a handle for steering, and
the meter is disposed in a recessed portion provided above the retainer.

20. An airbag device for a riding type vehicle comprising:
an inflator;
an airbag adapted to be expanded by gas discharged from the inflator; and
a retainer accommodating the airbag, the airbag being deployed upward from an opening of the retainer, wherein the retainer is provided below a meter provided in front of a handle for steering, and
the airbag is accommodated in an airbag accommodation space of the retainer and is at least partially disposed in a portion of the retainer that overlaps the meter.

\* \* \* \* \*